(12) United States Patent
Saitta et al.

(10) Patent No.: US 6,601,659 B2
(45) Date of Patent: Aug. 5, 2003

(54) TWIST DRILL

(75) Inventors: Robert S. Saitta, Broken Arrow, OK (US); Troy D. Wells, Sand Springs, OK (US); Christian Putzi, Tulsa, OK (US)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/859,871

(22) Filed: May 17, 2001

(65) Prior Publication Data

US 2002/0170752 A1 Nov. 21, 2002

(51) Int. Cl.⁷ .............................................. E21B 10/44
(52) U.S. Cl. ........................ 175/323; 175/394; 408/230
(58) Field of Search ................................. 175/323, 394; 76/108.6; 408/230

(56) References Cited

U.S. PATENT DOCUMENTS

| 2,246,418 A | * | 6/1941 | Froome et al. |
| 2,404,049 A | * | 7/1946 | Gepfert |
| 6,089,337 A | * | 7/2000 | Kleine et al. ................ 175/394 |
| 6,126,367 A | * | 10/2000 | Reed ........................... 408/230 |

* cited by examiner

*Primary Examiner*—William Neuder
(74) *Attorney, Agent, or Firm*—Sidley Austin Brown & Wood, LLP

(57) ABSTRACT

A twist drill including a spiral-forming hollow shaft (3) having a spiral-shaped inner surface, and drilling head (5) and shank (6) connected with the shaft (3) at its opposite ends, respectively; and a method for forming such a twist drill.

10 Claims, 1 Drawing Sheet

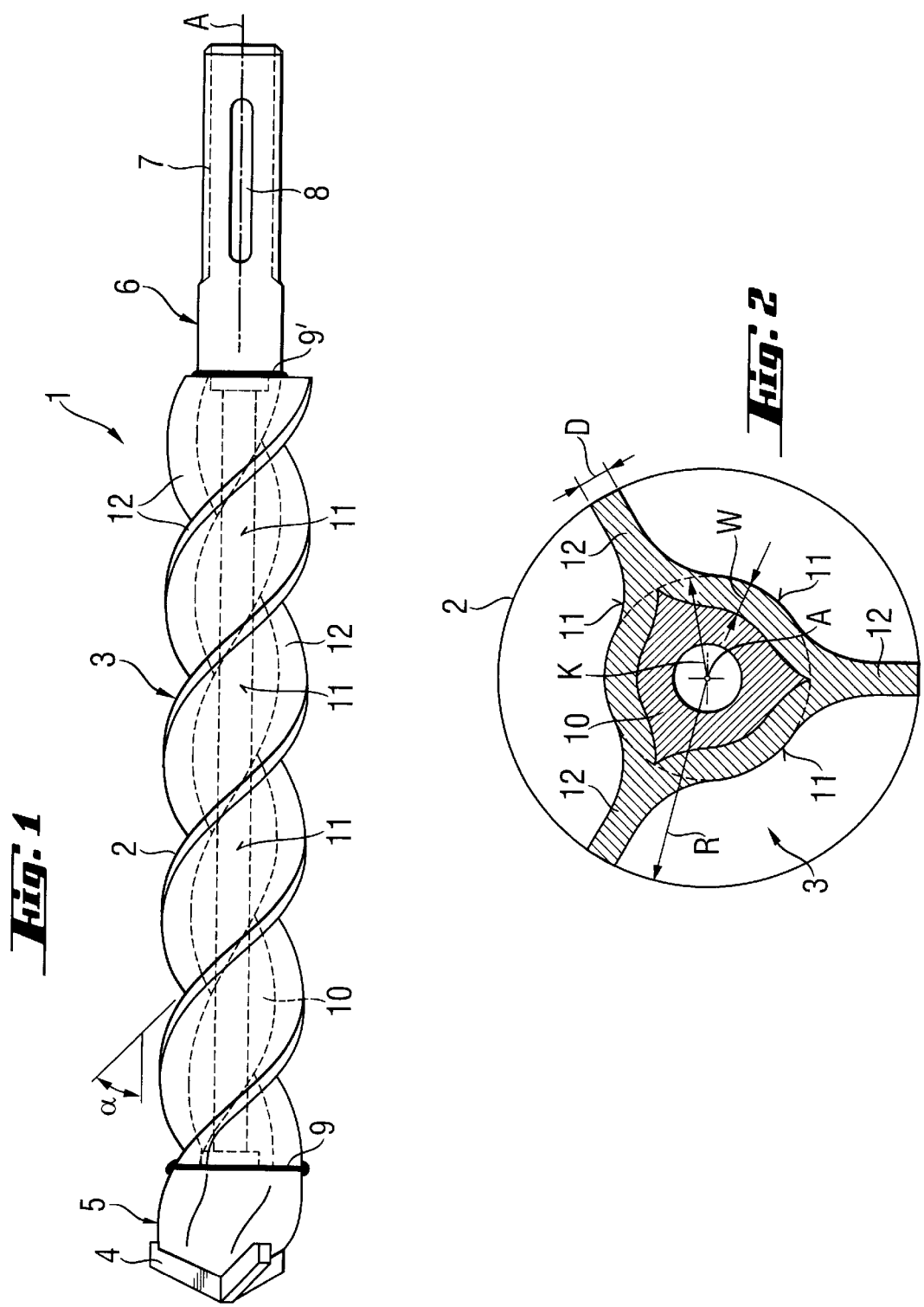

TWIST DRILL

BACKGROUND OF THE INVENTION

1. Field of the Invention

The present invention relates to a twist drill, which is subjected to torsional and impact loads, for abrasive removal of stone and stone-like materials such as concrete and brickwork.

2. Description of the Prior Art

Twist drills of the type described above are used with hand-held power tools, automatic power tools, and robot-operated power tools, e.g., in construction.

A twist drill includes a shaft forming, at least partially, a spiral, a drilling head formed of a hard material or provided with inserts formed of a hard material for removing stone material, and a shank provided at the shaft end opposite to the end at which the drilling head is secured. The shank is usually provided with entraining and locking grooves and is received in a power tool for joint rotation therewith and with a possibility of a limited axial movement relative thereto. Special shanks are used when particular functions such as introduction of cooling liquid or dust removal are contemplated.

Usually, at least the shaft, which is provided with a spiral, and the shank are formed as a one-piece part by machining or shaping a cylindrical blank. The manufacturing of twist drills, because of the large range of required drill lengths and drill diameters, is rather expensive. Moreover, the twist drill, which is formed of a solid material, is relatively heavy. Therefore, when such twist drills are used in construction, the large number of different twist drills, which is required, makes their carrying very difficult due to their large combined weight.

French patent No. 1,083,326 discloses an earth borer the shaft of which is formed of a tube with placed thereon spiral fillets formed of a bent metal sheet.

European Patent EP 541 942B1 discloses a bore hole tubing, which is formed as a disposable tool for mining works. The tubing includes a drilling head with inserts formed of a hard material and a hollow shaft formed as a steep-running spiral, and is formed as a one-piece part of a cold-deformable steel.

U.S. Pat. No. 6,102,142 discloses a boring rod with rings formed of an elastomeric material.

An object of the present invention is to provide a light and efficient twist drill to be used with a hand-held power tool.

Another object of the present invention is to provide a twist drill which can be produced in a simple manner in a wide range of drill lengths and drill diameters.

SUMMARY OF THE INVENTION

These and other objects of the present invention, which will become apparent hereinafter, are achieved by providing a twist drill which includes a hollow shaft which forms, at least partially, a spiral and has a spiral-shaped inner surface, and further includes a drilling head provided at one end of the shaft and having a cutting bit formed of a hard material, and a shank provided at another, opposite end of the shaft for securing the twist drill in a hand-held tool for joint rotation therewith and with a possibility of a limited axial displacement therein.

A hollow shaft, which is provided with a spiral not only outside but also inside, is very light and leads to application of a combined impact and torsional-impact load to the bit which results in an increased removal of material when used with a percussion rotary hand-held tool. The formation of a hollow, spiral-forming shaft having a spiral-shaped inner surface by shaping a tubular blank permits to use, during the shaping process, tubular cold rollers for forming the shaft. The drilling head and the shank are secured to opposite ends of the shaft by welding, brazing, and similar connection processes, which all can be used in different combinations. The manufacturing process permits to use special shanks for introducing cooling liquid or for aspirating the removable material through the hollow shaft.

Advantageously, the spiral is formed with a steep start angle of more than 45° which permits to transmit to the shaft sufficiently large axial impact components. Further, advantageously, instead of a conventional two-start spiral, a three-start spiral is formed which insures high efficiency in removing the drilled-off material and good guidance of the drill in the drilled bore.

Advantageously, the outer cross-sectional profile of the spiral has a trigonal symmetry with respect to the drill axis, which provides for a high flexural section modulus of the shaft in all directions and for uniform guidance of the twist drill along the wall of the drilled bore.

Advantageously, the drilling head has likewise, relative to the bits, a trigonal symmetry with respect to the drill axis, which insures a symmetrical transition to the spiral.

Advantageously, a spiral groove of the outer cross-sectional profile of the spiral forms a concave curve which increases the cross-section of the spiral groove and, thereby, the delivery volume.

Advantageously, in the radially outer region of the spiral, web-shaped spiral fillets extend between respective spiral grooves. Thereby, the spiral grooves are closed from inside, which limits the crevice corrosion there between.

Advantageously, the circumferential thickness of the radially oriented spiral fillets lies in a range between a single thickness and a double thickness of the hollow shaft.

Advantageously, the circle inscribed in the outer cross-sectional profile has a radius which amounts to from 0.4 to 0.7 times of the spiral radius. This insures transmission of an adequate tortional torque at a sufficient cross-section of the spiral groove.

Advantageously, the hollow shaft is filled with hollowed, viscoelastic material, which provides for vibration damping of the twist drill. By filling the hollow shaft, which is formed of a vibration-free, to a most possible extent, material, with the viscoelastic material, an optimal damping or filtering, with respect to main modes excited in the shaft during drilling, is achieved. The used filling viscoelastic material has a high damping value in a range of operational temperatures in which the frequency range of main modes prevails.

A twist drill including a hollow shaft forming, at least partially, a spiral and having a spiral-shaped inner surface, a drilling head provided at one end of the shaft and having a cutting bit formed of a hard material, and a shank for securing the twist drill in a hand-held tool for joint rotation therewith and with a possibility of a limited axial displacement therein, is produced in several steps.

In the first step, a tubular blank formed of metal or metal alloy is shaped, preferably, with three-cheek cold rollers, to form thereon outer and inner spiral. In the second step, the blank provided with the outer and inner spiral is cut to a predetermined length to form the shaft. In the third step, the shaft is connected preferably by TIG-welding, laser welding, or brazing, at opposite ends thereof, with separately formed drilling head and shank.

The foregoing manufacturing process insures, by using standartized drilling heads and shanks, producing twist drills having different sizes, and with arbitrary selected lengths.

Advantageously, in the last step, a drilling head, which is formed as a "green" work piece, is connected with the hard metal cutting edges, with the connection being effected with sintering of the "green" drilling head.

The novel features of the present invention, which are considered as characteristic for the invention, are set forth in the appended claims. The invention itself, however, both as to its construction its mode of operation, together with additional advantages and objects thereof, with be best understood from the following detailed description of preferred embodiment, when read with reference to the accompanying drawings.

BRIEF DESCRIPTION OF THE DRAWINGS

The drawings show:

FIG. 1 a side view of a twist drill according to the present invention; and

FIG. 2 a cross-sectional view along line II—II in FIG. 1.

DETAILED DESCRIPTION OF THE PREFERRED EMBODIMENTS

A twist drill 1 according to the present invention, which is shown in the drawings, includes a hollow shaft 3 which forms a spiral 2 and has an inner spiral-shaped surface, a drilling head 5 which is provided at one end of the shaft 3, and a shank 6 which is provided at another end of the shaft 3. The drilling head 5 is formed symmetrically with respect to its cutting bit 4 formed of a hard material. The shank 6 is provided with entraining grooves 7 and locking grooves 8 and is so formed that it appropriately engages in the shaft 3, formlockingly by interlocking of the materials of the shank 6 and the shaft, by circumferential connection seams 9 and 9'. The three-start spiral 2 is formed as a steep spiral and with a start angle α of 50°. The hollow shaft 3 is filled with a viscoelastic, hollowed, as a result of being centrifuged, material 10.

As shown in FIG. 2, the outer cross-sectional profile of the spiral 2 has a trigonal symmetry with respect to the drill axis A. The profile of a spiral groove 11 of the outer cross-sectional profile of the spiral 2 forms a plurality of concave curves. Each spiral groove 11 runs-out, in the radially outer region of the spiral 2, along a web-shaped spiral fillet 12 which is arranged between two spiral grooves 11 and has a thickness D corresponding to a wall width W of the shaft 3. A radius K of a circle inscribed into the outer cross-sectional profile of the spiral 2 amounts to a half of the spiral radius R.

Though the present invention was shown and described with references to the preferred embodiment, such are merely illustrative of the present invention and are not to be construed as a limitation thereof, and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A twist drill, comprising a hollow shaft forming, at least partially, a spiral (2) and having a spiral-shaped inner surface; a drilling head (5) provided at one end of the shaft (3), having a cutting bit (4) formed of a hard material, and having, with respect to the cuffing bit (4), a triagonal symmetry with respect to a drill axis (A), and a shank for securing the twist drill in a hand-held tool for joint rotation therewith and with a possibility of a limited axial displacement therein.

2. A twist drill according to claim 1, wherein the spiral (2) is formed as a steep spiral.

3. A twist drill according to claim 2, wherein the spiral (2) is formed as a three-start spiral.

4. A twist drill according to claim 3, wherein the outer cross-sectional profile of the spiral (2) has a triagonal symmetry with respect to a drill axis (A).

5. A twist drill, comprising a hollow shaft forming, at least partially, a spiral (2) and having a spiral-shaped inner surface; a drilling head (5) provided at one end of the shaft (3) and having a cutting bit (4) formed of a hard material; and a shank for securing the twist drill in a hand-held tool for joint rotation therewith and with a possibility of a limited axial displacement therein, wherein an outer cross-sectional profile of the spiral (2) includes a plurality of spiral grooves, and a profile of each spiral groove forms a concave curve.

6. A twist drill according to claim 5, wherein each spiral groove (11) runs-out, in a radially outer region of the spiral (2) along a respective web-shaped spiral fillet (12) arranged between two respective spiral grooves (11).

7. A twist drill according to claim 5, wherein a circle inscribed in the outer cross-sectional profile of the spiral (2) has a radius (k) which amounts to from 0.4 to 0.7 times of a spiral radius (R).

8. A twist drill, comprising a hollow shaft forming, at least partially, a spiral (2) and having a spiral-shaped inner surface; a drilling head (5) provided at one end of the shaft (3) and having a cutting bit (4) formed of a hard material; and a shank for securing the twist drill in a hand-held tool for joint rotation therewith and with a possibility of a limited axial displacement therein, wherein the hollow shaft (3) is filled at least partially with viscoelastic material (10).

9. A twist drill according to claim 8, wherein the shaft-filling, viscoelastic material (10) has a high damping value in the region of operational temperatures in which the frequency range of main vibration modes of the shaft (3) prevails.

10. A twist drill according to claim 9 wherein a circumferential thickness (D) of a radially extending spiral fillet (12) lies in a region between a single thickness (W) of the shaft (3) and a double thickness thereof.

* * * * *